United States Patent
Lee

(10) Patent No.: US 8,638,844 B2
(45) Date of Patent: Jan. 28, 2014

(54) METHOD AND APPARATUS FOR STORING DECODED MOVING PICTURES WITH A REDUCED MEMORY REQUIREMENT

(75) Inventor: Kun-Bin Lee, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1119 days.

(21) Appl. No.: 12/166,305

(22) Filed: Jul. 1, 2008

(65) Prior Publication Data

US 2010/0002776 A1    Jan. 7, 2010

(51) Int. Cl.
*H04N 11/02* (2006.01)

(52) U.S. Cl.
USPC .......................................... 375/240

(58) Field of Classification Search
USPC ................. 375/240, 240.01–240.29
See application file for complete search history.

(56) References Cited

U.S. PATENT DOCUMENTS

| | | | |
|---|---|---|---|
| 5,754,235 A * | 5/1998 | Urano et al. | 375/240.03 |
| 5,777,677 A | 7/1998 | Linzer et al. | |
| 6,310,919 B1 | 10/2001 | Florencio | |
| 6,404,814 B1 * | 6/2002 | Apostolopoulos et al. | 375/240.12 |
| 6,792,149 B1 | 9/2004 | Florencio | |
| 6,968,005 B2 * | 11/2005 | Hannuksela | 375/240.01 |
| 7,116,714 B2 * | 10/2006 | Hannuksela | 375/240.12 |
| 7,400,684 B2 * | 7/2008 | Hannuksela et al. | 375/240.27 |
| 7,609,763 B2 * | 10/2009 | Mukerjee et al. | 375/240.16 |
| 7,711,052 B2 * | 5/2010 | Hannuksela et al. | 375/240.27 |
| 7,751,473 B2 * | 7/2010 | Hannuksela | 375/240.01 |
| 7,852,853 B1 * | 12/2010 | Black et al. | 370/395.42 |
| 8,165,216 B2 * | 4/2012 | Chen et al. | 375/240.24 |
| 8,250,618 B2 * | 8/2012 | Rosenzweig et al. | 725/96 |
| 2007/0110325 A1 | 5/2007 | Lee | |
| 2008/0115176 A1 * | 5/2008 | Rodriguez | 725/89 |
| 2009/0097555 A1 * | 4/2009 | Baillavoine et al. | 375/240.12 |

* cited by examiner

*Primary Examiner* — Dmitry H Levitan
(74) *Attorney, Agent, or Firm* — Winston Hsu; Scott Margo

(57) ABSTRACT

A method for storing decoded moving pictures with a reduced memory requirement includes: decoding header information in a bitstream; storing a decoded moving picture as a buffered picture; determining a less important portion of the buffered picture; and performing a post-processing operation on the less important portion of the buffered picture according to the header information. An associated apparatus for storing decoded moving pictures with a reduced memory requirement is further provided.

25 Claims, 5 Drawing Sheets

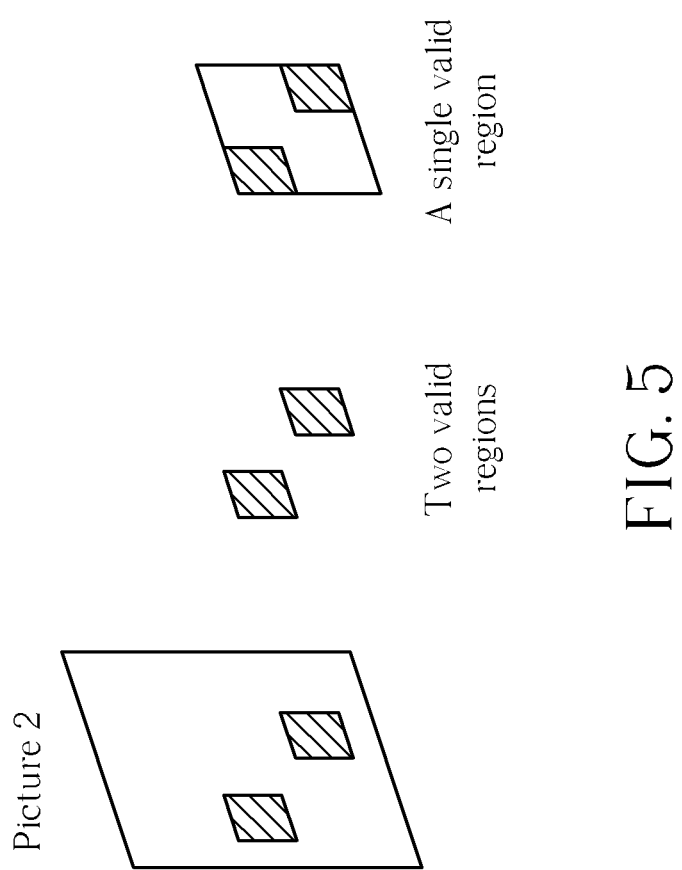

METHOD AND APPARATUS FOR STORING DECODED MOVING PICTURES WITH A REDUCED MEMORY REQUIREMENT

BACKGROUND

The present invention relates to motion compensation for a multiple reference frame architecture, and more particularly, to methods and apparatus for storing decoded moving pictures with a reduced memory requirement in contrast to the related art.

Regarding a multiple reference frame architecture (for example, an apparatus complying with H.264 specifications), some problems such as complicated memory access behavior and a high memory access rate of a main memory are introduced while multi-frame motion compensation is employed, where the main memory can be a dynamic random access memory (DRAM) accessed by a processor of the apparatus. Typically, the processor and the main memory are respectively positioned in different chips within the apparatus, so the memory bandwidth of the main memory may be insufficient due to complicated memory access behavior and/or high memory access rate required by a multiple reference frame architecture.

According to the related art, some suggestions with regard to a reduction of the corresponding memory requirement (e.g. the memory requirement of the DRAM) are proposed in order to solve at least a portion of the problems mentioned above. One suggests scaling decoded pictures, however, the picture quality is usually degraded with down-scaling. Another suggestion is compressing decoded pictures in a simpler way without randomly accessing a macroblock (MB). According to this suggestion, however, it is also very hard to prevent the picture quality from being degraded. According to another suggestion, just-in-time decoding of specific frames may be applied. However, the corresponding computation load is extremely heavy to cost-efficient hardware architecture.

As mentioned, the overall performance of an architecture implemented with at least one of the aforementioned suggestions is typically degraded due to some native characteristics of the multi-frame motion compensation. For example, referring to a situation shown in FIG. 1, reference data of a MB may be derived from multiple frames. In addition, more motion vectors and more intra information are involved in contrast to single frame motion compensation. Additionally, some issues related to long-term memory management might be encountered. Thus, according to the related art, even though the goal of reducing the corresponding memory requirement may be achieved, it is hard to prevent from introducing unwanted side effects.

SUMMARY

It is therefore an objective of the claimed invention to provide methods and apparatus for storing decoded moving pictures with a reduced memory requirement in contrast to the related art, in order to solve the above-mentioned problem.

It is another objective of the claimed invention to provide methods and apparatus for storing decoded moving pictures with a reduced memory requirement, in order to reduce the data amount of least important picture(s), so unwanted side effects that typically occur in the related art can be prevented.

It is another objective of the claimed invention to provide methods and apparatus for storing decoded moving pictures with a reduced memory requirement, in order to perform a post-processing operation on at least one portion of a reconstructed picture that has been completely decoded, rather than on a current picture or a current macroblock (MB) being decoded as suggested according to the related art.

An exemplary embodiment of a method for storing decoded moving pictures with a reduced memory requirement comprises: decoding header information in a bitstream; storing a decoded moving picture as a buffered picture; determining a less important portion of the buffered picture; and performing a post-processing operation on the less important portion of the buffered picture according to the header information.

An exemplary embodiment of an apparatus for storing decoded moving pictures with a reduced memory requirement comprises a main memory and at least one processor coupled to the main memory. The main memory is utilized for buffering the decoded moving pictures. In addition, the processor is utilized for decoding header information in a bitstream, determining a less important portion of a buffered picture, and performing a post-processing operation on the less important portion of the buffered picture according to the header information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates a plurality of reference regions saved as a spare matrix and a linked region according to a variation of the first embodiment.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
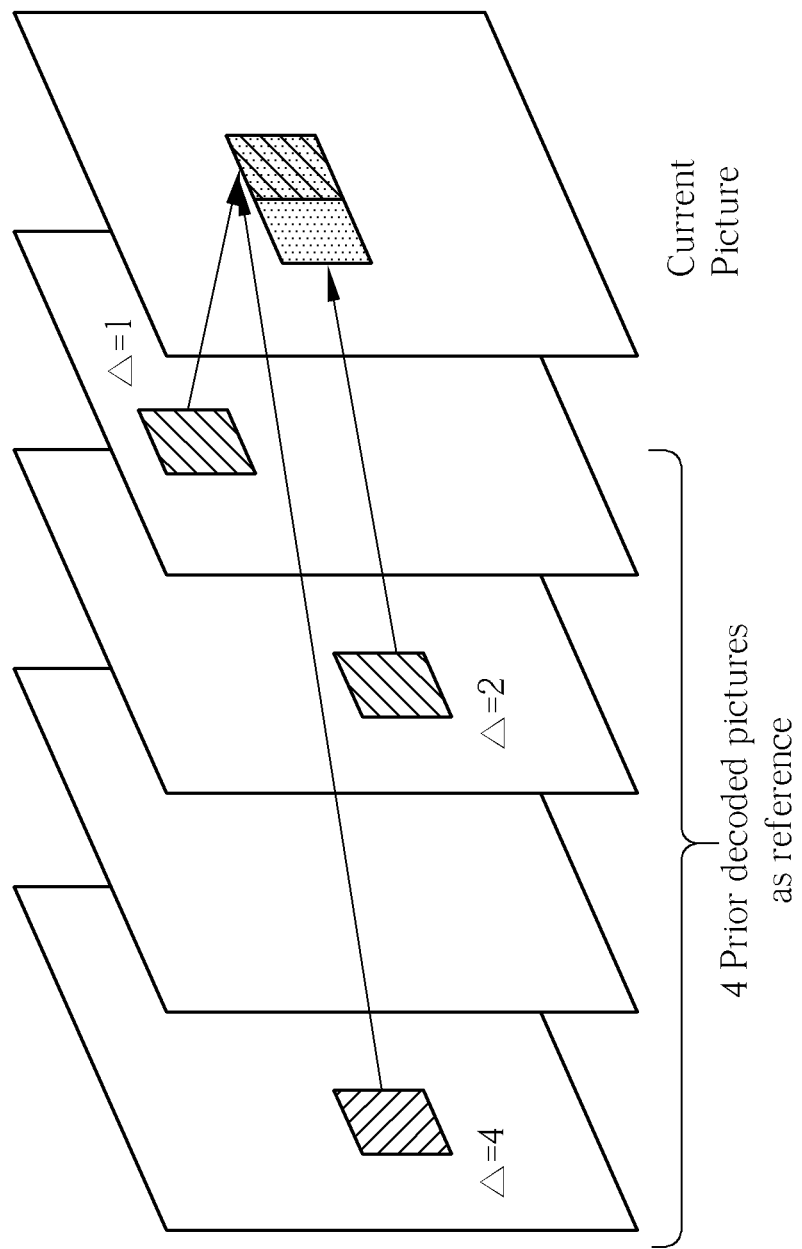
FIG. 1 illustrates a situation where multi-frame motion compensation is performed according to the related art.
Figure 2:
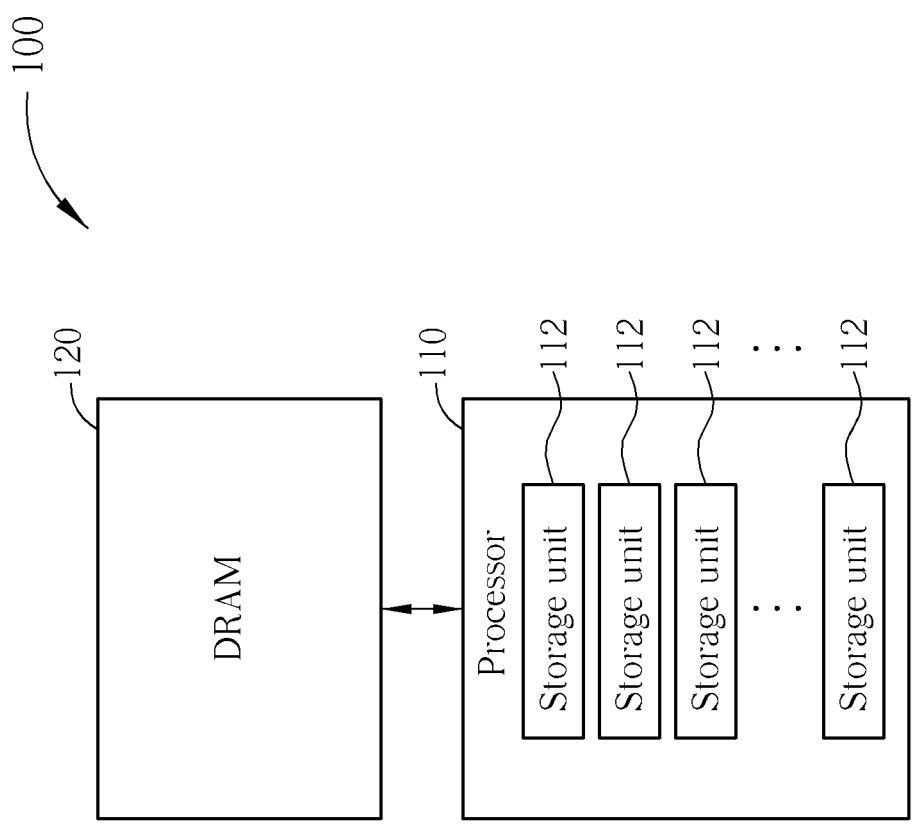
FIG. 2 is a diagram of an apparatus for storing decoded moving pictures with a reduced memory requirement according to one embodiment of the present invention.

Please refer to FIG. 2. FIG. 2 is a diagram of an apparatus 100 for storing decoded moving pictures with a reduced memory requirement according to one embodiment of the present invention. The apparatus 100 comprises at least one processor such as a processor 110 and a main memory such as a dynamic random access memory (DRAM) 120, where the main memory is an external memory for the processor 110, and can be utilized for temporarily storing the moving pictures. More particularly, in this embodiment, the main memory can be utilized for temporarily storing the moving pictures to be displayed, so the main memory can be considered as a display buffer.

In addition, the processor 110 comprises at least one storage unit for temporarily storing header information derived from a bitstream for the processor 110. For example, the header information can be information extracted from one or more sequence headers, one or more picture headers, one or more slice headers, and one or more macroblock (MB) headers. In addition, the header information may correspond to one of a motion vector (MV), a quantization parameter (QP), a coding mode, and a reference frame, or correspond to a combination of some of a MV, a QP, a coding mode, and a reference frame.

According to this embodiment, the header information mentioned above represents the header information of a picture being decoded or the header information of a picture to be decoded in the future. As a result, the header information of this embodiment can be referred to as look-ahead information, where the look-ahead information may correspond to at least one portion of at least one picture that has not been completely decoded. Thus, the processor 110 is capable of determining whether to discard or keep a specific portion of decoded data stored in the DRAM 120 (e.g., the data of a decoded picture or the data of a portion of a decoded picture) according to the look-ahead information (e.g., reference frame information of a picture to be decoded).

According to different implementation choices of this embodiment, the storage unit mentioned above can be one or more logical/physical buffers embedded within the processor 110. More particularly, in this embodiment, the processor 110 comprises a plurality of storage units 112 for temporarily storing the look-ahead information of some pictures that have not been completely decoded, respectively. According to a variation of this embodiment, as soon as the processor 110 derives the look-ahead information, the look-ahead information is utilized right away for certain decisions and will no longer be utilized, and therefore, it is unnecessary to temporarily store the look-ahead information.

In this embodiment, the aforementioned storage unit for temporarily storing the header information derived from the bitstream for the processor 110 (e.g., the storage units 112 shown in FIG. 2) can be embedded within the processor 110 as mentioned. This is only for illustrative purposes, and is not meant to be a limitation of the present invention. According to another variation of this embodiment, the aforementioned storage unit for temporarily storing the header information derived from the bitstream for the processor 110 can be positioned outside the processor 110. According to another variation of this embodiment, the processor 110 utilizes the DRAM 120 to temporarily store the header information derived from the bitstream.

According to this embodiment, the storage units 112 can be implemented with at least one static random access memory (SRAM). The processor 110 may utilize the header information in the storage units 112 as look-ahead information. By utilizing the look-ahead information, the processor 110 may determine data accessing behavior regarding the main memory (i.e. the DRAM 120 in this embodiment) when decoding a current picture. In practice, the storage units 112 can be a plurality of logical buffers.

According to a variation of this embodiment, when the storage capacity of the main memory is insufficient, the processor 110 is capable of performing dynamic compression or dynamic scaling on at least one less important portion of at least one buffered picture stored in the main memory, instead of discarding data as mentioned, where the less important portion can be determined in advance. For example, when the header information such as the reference frame information indicates that the storage capacity of the DRAM 120 is insufficient, the processor 110 may perform compression or scaling on less important portions of the buffered pictures stored in the DRAM 120.

According to another variation of this embodiment, when the storage capacity of the main memory is insufficient, the processor 110 may dynamically determine which of a plurality of strategies should be applied. For example, one of the strategies is discarding a specific portion of decoded data as mentioned in the embodiment shown in FIG. 2, while another of the strategies is performing dynamic compression or dynamic scaling as mentioned in the previous variation.

Figure 3:
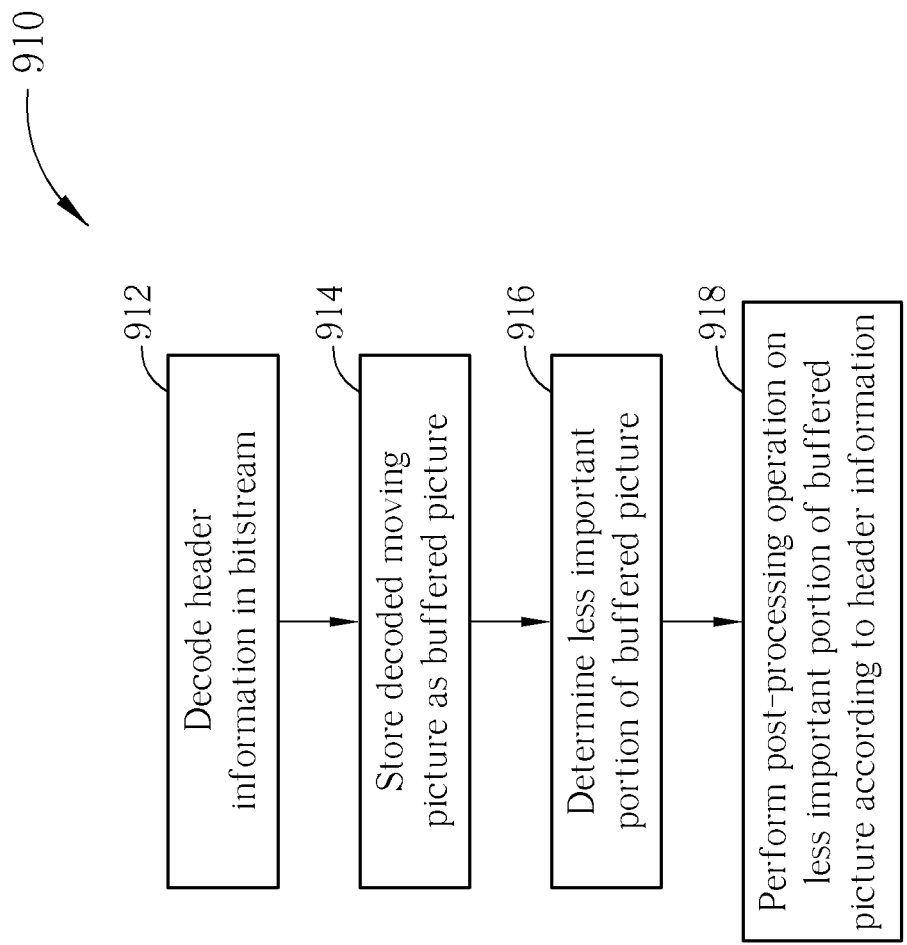
FIG. 3 is a flowchart of a method for storing decoded moving pictures with a reduced memory requirement according to a first embodiment of the present invention.

FIG. 3 is a flowchart of a method 910 for storing decoded moving pictures with a reduced memory requirement according to a first embodiment of the present invention. The method 910 can be applied to the apparatus 100 shown in FIG. 2, and more particularly, the processor 110. In addition, the method 910 can be implemented by utilizing the apparatus 100 shown in FIG. 2, and can further be described as follows.

Step 912: The processor 110 decodes header information in a bitstream, where the bitstream carries data of pictures to be decoded.

Step 914: The main memory stores a decoded moving picture as a buffered picture. More specifically, the DRAM 120 buffers (or temporarily stores) a plurality of decoded moving pictures as buffered pictures.

Step 916: The processor 110 determines at least a less important portion of a buffered picture of the buffered pictures.

Step 918: The processor 110 performs a post-processing operation on the less important portion of the buffered picture according to the header information, in order to reduce the data amount of the buffered picture stored in the main memory.

It should be noted that in this embodiment, the same processor 110 is utilized for decoding the header information in the bitstream, determining the less important portion, and performing the post-processing operation on the less important portion. This is only for illustrative purposes, and is not meant to be a limitation of the present invention. According to a variation of this embodiment, the processor 110 can be replaced with a plurality of processors for executing the aforementioned operations in Step 912, Step 916, and Step 918. For example, one of the plurality of processors is utilized for decoding the header information in the bitstream, while another of the plurality of processors is utilized for performing the post-processing operation on the less important portion. In another example, a processor is utilized for determining whether to perform the post-processing operation, while another processor is utilized for decoding the header information in the bitstream.

According to different aspects of this embodiment, the header information may comprise the look-ahead information mentioned above, and/or represent specific information that can be utilized for determining whether the storage capacity of the main memory is insufficient, where the specific information is within a header of a currently decoded frame, a currently decoded slice, or a currently decoded MB.

For example, according to a first aspect of this embodiment, the header information comprises the look-ahead information mentioned above, where the look-ahead information corresponds to at least one portion of at least one picture that has not been completely decoded. Thus, the processor 110 determines the less important portion of the buffered picture according to the look-ahead information. However, this is only for illustrative purposes only, and is not meant to be a limitation of the present invention. According to a variation of this embodiment, the processor 110 determines the less important portion of the buffered picture according to the header information.

In practice, the look-ahead information comprises a motion vector, a quantization parameter, a coding mode, and/or reference frame information. That is, the look-ahead information comprises one or a combination of a motion vector, a quantization parameter, a coding mode, and reference frame information. For example, the coding mode represents an intra/inter mode, a partition size, or a temporal direct mode.

According to the first aspect of this embodiment, the post-processing operation comprises discarding the less important portion of the buffered picture from the main memory, where the less important portion of the buffered picture is determined according to the look-ahead information. More specifically, the processor 110 determines whether to discard a specific portion of decoded data in the DRAM 120 according to the look-ahead information.

In addition, according to a second aspect of this embodiment, the header information comprises the aforementioned specific information that can be utilized for determining whether the storage capacity of the main memory is insufficient. The post-processing operation comprises one or a combination of a scaling operation and a compression operation (i.e. a scaling operation, a compression operation, or a combination of them) in order to reduce the data amount of the less important portion. The processor 110 determines whether to perform the scaling operation or the compression operation on the less important portion according to whether the storage capacity of the main memory (e.g. the DRAM 120) is insufficient.

In general, the less important portion can be determined by some determination factors described in the following. For example, the processor 110 determines the less important portion of the buffered picture by one or a combination of quality degradation related data, computation complexity related data, and memory requirement related data. For example, the quality degradation related data comprises at least one quantization parameter (QP). In addition, the processor 110 determines the less important portion of the buffered picture by considering whether the buffered picture belongs to at least one of a non-existing picture, an intra-coded-only picture, and a non-reference picture.

In this embodiment, the less important portion of the buffered picture may correspond to a least referenced picture within the plurality of buffered pictures, a reference picture that is not referenced for a period of time, or a picture which is the farthest reference picture with respect to a current picture and is not marked as a long term picture.

Regarding the size of the less important portion that the processor 110 determines, it may vary according to different determination factors applied and according to different contents of the bitstream. For example, the less important portion of the buffered picture comprises at least one macroblock (MB), at least one MB row, at least one picture slice, or at least one decoded picture.

Although either of the first aspect and the second can be applied, this is only for illustrative purposes, and is not meant to be a limitation of the present invention. Please note that both the first and the second aspects can be applied to the same apparatus 100, and more particularly, the same processor 110, without hindering the implementation of the present invention. That is, the processor 110 may selectively discard a specific portion of decoded data as mentioned, or selectively perform dynamic compression or dynamic scaling on at least one less important portion of at least one buffered picture stored in the main memory. Accordingly, more details regarding the apparatus 100 shown in FIG. 2 and the method 910 shown in FIG. 3 are further described as follows.

In this embodiment, during a period of time, the processor 110 detects quality degradation related data, computation complexity related data, and/or memory requirement related data of the moving pictures. Here, the quality degradation related data typically represents the degree of quality degradation of a predicted result of a post-processing operation regarding a picture under consideration, and the memory requirement related data typically represents a predicted result of the memory requirement for the post-processing operation regarding a picture under consideration. In addition, the computation complexity related data typically represents the degree of computation complexity of performing the post-processing operation on a picture under consideration and the degree of computation complexity of performing its inverse operation.

In addition, according to the quality degradation related data, the computation complexity related data, and/or the memory requirement related data, the processor 110 determines whether to perform the post-processing operation on at least one portion of a specific reconstructed picture out of a plurality of reconstructed pictures to reduce the overall memory requirement for storing the moving pictures, where the reconstructed pictures, which can be temporarily stored in the main memory (i.e. the DRAM 120 in this embodiment), represent the moving pictures in a reconstructed form.

According to different implementation choices of this embodiment, the period of time mentioned above may correspond to at least one MB, at least one MB row, at least one slice of picture, or at least one picture (or frame). In addition, according to different implementation choices of this embodiment, the at least one portion of the specific reconstructed picture may comprise at least one MB, at least one MB row, at least one picture slice, or the whole of the specific reconstructed picture.

In this embodiment, the processor 110 is capable of decoding the moving pictures to generate the reconstructed pictures. The processor 110 decodes the current picture with multi-frame motion compensation, where each frame carries image data corresponding to a picture, and reference data in different frames may be referenced. Please note that the reference data mentioned above may represent data of some reference regions in the referenced frames. Some solutions in the related art perform post-processing on a current MB in the current picture (frame). According to this embodiment, however, if the processor 110 determines to perform the post-processing operation, the processor 110 performs the post-processing operation on an already reconstructed picture (more particularly, on the at least one portion of the specific reconstructed picture out of the plurality of reconstructed pictures) to reduce the overall memory requirement for storing the moving pictures.

More particularly, in this embodiment, the post-processing operation is capable of reducing data amount of a reconstructed picture that has been completely decoded, where the post-processing operation may comprise a scaling operation or a compression operation. The processor 110 typically keeps the reconstructed pictures unchanged for as long as possible. If the quality degradation related data, the computation complexity related data, and/or the memory requirement related data indicate that the specific reconstructed picture is one of the least important reconstructed picture(s) within the plurality of reconstructed pictures, the processor 110 determines to perform the post-processing operation on the at least one portion of the specific reconstructed picture. The least important reconstructed pictures are the ones having least influence to video degradation and/or coding performance. For example, reference pictures are comparatively more important than non-reference pictures.

In some embodiments, if the specific reconstructed picture is a non-existent picture, a non-reference picture, or one of the least referenced picture(s) within the plurality of reconstructed pictures, the processor 110 may determine to perform the post-processing operation on at least one portion of the specific reconstructed picture. In addition, if the specific reconstructed picture is a reference picture that is not referenced for a period of time, the processor 110 may also determine to perform the post-processing operation on at least one portion of the specific reconstructed picture. Additionally, if the specific reconstructed picture is the farthest reference picture with respect to a current picture, and if the specific reconstructed picture is not marked as a long term picture, the processor 110 may also determine to perform the post-processing operation on at least one portion of the specific reconstructed picture. In another example, if the specific reconstructed picture is an intra-coded-only picture, the processor 110 typically determines to not perform the post-processing operation on at least one portion of the specific reconstructed picture.

Thus, by utilizing various kinds of adaptive approaches, the processor 110 may first derive the quality degradation related data, the computation complexity related data, and/or the memory requirement related data as mentioned, and further determine whether to perform the post-processing operation on at least one portion of the specific reconstructed picture accordingly. As the overall data amount can be reduced by performing the post-processing operation on least important reconstructed picture(s) within the plurality of reconstructed pictures, the goal of reducing the memory requirement and further reducing the number of memory access operations regarding the main memory (i.e. the DRAM 120 in this embodiment) is therefore achieved.

Figure 4:
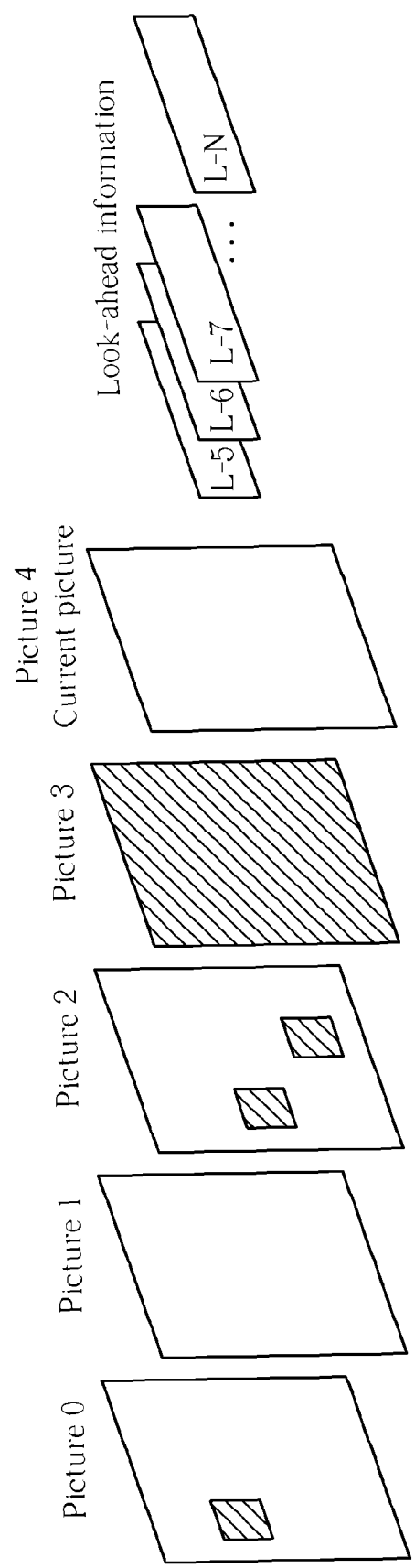
FIG. 4 illustrates a situation where multi-frame motion compensation is performed by utilizing look-ahead information according to the first embodiment, where the look-ahead information is derived from looking at a plurality of pictures ahead in decoding order.

FIG. 4 illustrates a situation where multi-frame motion compensation is performed by utilizing look-ahead information according to the first embodiment, where the look-ahead information is derived from a plurality of pictures ahead of the current picture in decoding order. With Picture 4 being the current picture at the time point of this situation as shown in FIG. 4, data L-5, L-6, L-7, . . . , and L-N temporarily stored in the storage units 112 respectively represent the look-ahead information corresponding to Pictures 5 through N. As most encoders only search a limited range of search windows for a limited number of reference frames, and as the lifetime of each valid region of each reconstructed frame can be derived according to the look-ahead information, the processor 110 of this embodiment may keep the data corresponding to these regions as required and discard unwanted data accordingly.

FIG. 5 illustrates a plurality of reference regions saved as a linked region according to a variation of the first embodiment. It is noted that, when applicable, the processor 110 saves some useful reference regions (e.g. some reference regions in a reference frame for the current picture) as a linked region as shown in FIG. 5 according to the header information, in order to reduce memory access requirement. For example, in a reference frame such as Picture 2 shown in FIG. 5, the processor 110 determines that there are two useful reference regions (shaded area in FIG. 5) to be saved as a linked region (labeled "a single valid region"). However, this is only for illustrative purposes, and is not meant to be a limitation of the present invention. According to another variation of the first embodiment, when applicable, the processor 110 saves the useful reference regions mentioned above as a spare matrix (labeled "Two valid regions") according to the header information, in order to reduce memory size requirement.

According to a second embodiment, which is another variation of the first embodiment, non-reference pictures can be kept until displayed. According to a variation of the second embodiment, if the storage volume of the main memory (e.g. the DRAM 120) is considered sufficient, it is not necessary to discard data as usual. For example, a whole reference picture can still be kept even if only a portion of reference regions therein will be used later. As a result, at least memory bandwidth requirement can be reduced. In some variations of the first embodiment, the corresponding time, calculation load, and/or memory bandwidth requirement can be reduced.

According to another embodiment, which is another variation of the first embodiment, when the storage volume of the main memory (e.g. the DRAM 120) is considered insufficient, which regions/frames are least important can be determined by the processor 110, and lossy approaches for easily accessing data, for example, scaling or recompressing data of these frames can be performed. In addition, re-decoding an original bitstream can also be performed, where re-decoding an original bitstream for intra-coded MBs is preferred. In some situation, if applicable, lossless compression can also be utilized.

Those skilled in the art will readily observe that numerous modifications and alterations of the device and method may be made while retaining the teachings of the invention.

What is claimed is:

1. A method for storing decoded moving pictures, comprising:
    decoding header information in a bitstream;
    storing a decoded moving picture as a buffered picture;
    determining a less important portion with lower importance than other portions of the buffered picture according to look-ahead information, wherein the look-ahead information corresponds to at least one portion of at least one picture that has not been completely decoded, and the at least one picture is ahead of a currently decoded picture in a decoding order; and
    performing a post-processing operation on the less important portion of the buffered picture according to the look-ahead information.

2. The method of claim 1, wherein the less important portion of the buffered picture is determined by at least one of quality degradation related data, computation complexity related data, and memory requirement related data.

3. The method of claim 2, wherein the less important portion of the buffered picture is determined by considering whether the buffered picture belongs to at least one of a non-existing picture, an intra-coded-only picture, and a non-reference picture complying with H.264 standard.

4. The method of claim 2, wherein the quality degradation related data comprises quantization parameter (QP).

5. The method of claim 2, wherein the less important portion of the buffered picture corresponds to a least referenced picture having the least number of times of being referenced within the plurality of buffered pictures.

6. The method of claim 2, wherein the less important portion of the buffered picture corresponds to a reference picture that is not referenced for a period of time or a picture which is the farthest reference picture with respect to a currently decoded picture and is not marked as a long term picture.

7. The method of claim 1, wherein the less important portion of the buffered picture comprises at least one macroblock (MB), MB row, picture slice, or decoded picture.

8. The method of claim 1, wherein the post-processing operation is capable of reducing data amount of the buffered picture.

9. The method of claim 8, wherein the post-processing operation comprises at least one of a scaling operation and a compression operation.

10. The method of claim 1, wherein the look-ahead information is derived from the header information.

11. The method of claim 1, wherein the look-ahead information comprises at least one of a motion vector, a quantization parameter, a coding mode, and reference frame information.

12. The method of claim 1, wherein the post-processing operation comprises discarding the less important portion of the buffered picture.

13. The method of claim 1, further comprising:
saving a plurality of reference regions as a linked region according to the header information.

14. The method of claim 1, further comprising:
saving a plurality of reference regions as a spare matrix according to the header information.

15. An apparatus for storing decoded moving pictures, comprising:
a main memory for buffering the decoded moving pictures; and
at least one processor, coupled to the main memory, for decoding header information in a bitstream, determining a less important portion with lower importance than other portions of a buffered picture according to look-ahead information, wherein the look-ahead information corresponds to at least one portion of at least one picture that has not been completely decoded, and the at least one picture is ahead of a currently decoded picture in a decoding order, and performing a post-processing operation on the less important portion of the buffered picture according to the look-ahead information.

16. The apparatus of claim 15, wherein the processor determines the less important portion of the buffered picture by at least one of quality degradation related data, computation complexity related data, and memory requirement related data.

17. The apparatus of claim 16, wherein the processor determines the less important portion of the buffered picture by considering whether the buffered picture belongs to at least one of a non-existing picture, an intra-coded-only picture, and a non-reference picture complying with H.264 standard.

18. The apparatus of claim 16, wherein the less important portion of the buffered picture corresponds to a least referenced picture within the plurality of buffered pictures, a reference picture that is not referenced for a period of time, or a picture which is the farthest reference picture with respect to a currently decoded picture and is not marked as a long term picture.

19. The apparatus of claim 15, wherein the processor performs the post-processing operation to reduce data amount of the buffered picture stored in the main memory.

20. The apparatus of claim 19, wherein the post-processing operation comprises at least one of a scaling operation and a compression operation.

21. The apparatus of claim 15, wherein the look-ahead information is derived from the header information.

22. The apparatus of claim 15, wherein the look-ahead information comprises at least one of a motion vector, a quantization parameter, a coding mode, reference frame information.

23. The apparatus of claim 15, wherein the post-processing operation comprises discarding the less important portion of the buffered picture.

24. The apparatus of claim 15, wherein the processor saves a plurality of reference regions as a linked region according to the header information.

25. The apparatus of claim 15, wherein the processor saves a plurality of reference regions as a spare matrix according to the header information.

* * * * *